(12) United States Patent
Orlitzky et al.

(10) Patent No.: US 8,783,418 B2
(45) Date of Patent: Jul. 22, 2014

(54) AUTOMATIC MOTOR DRIVEN IN-LINE PISTON PUMP LUBRICATOR

(75) Inventors: Anton Orlitzky, Delta (CA); Stephan Orlitzky, Delta (CA); Danny Sheremeta, Delta (CA)

(73) Assignee: Natasa Enterprises Ltd, Delta, British Columbia (CA)

( * ) Notice: Subject to any disclaimer, the term of this patent is extended or adjusted under 35 U.S.C. 154(b) by 1672 days.

(21) Appl. No.: 11/579,668

(22) PCT Filed: May 6, 2005

(86) PCT No.: PCT/CA2005/000705
§ 371 (c)(1),
(2), (4) Date: Nov. 10, 2008

(87) PCT Pub. No.: WO2005/108850
PCT Pub. Date: Nov. 17, 2005

(65) Prior Publication Data
US 2009/0133962 A1    May 28, 2009

Related U.S. Application Data

(60) Provisional application No. 60/568,267, filed on May 6, 2004.

(51) Int. Cl.
*F16N 13/14* (2006.01)

(52) U.S. Cl.
USPC .......................................................... 184/37

(58) Field of Classification Search
CPC ................................. F16N 13/02; F16N 13/14
USPC .................. 184/37.1, 105.1, 27.1, 7.4, 6.28
See application file for complete search history.

(56) References Cited

U.S. PATENT DOCUMENTS

| | | |
|---|---|---|
| 612,075 A | 10/1898 | Webendorfer |
| 897,849 A | 9/1908 | Prescott |
| 1,162,997 A | 12/1915 | Ferguson |
| 1,277,842 A | 9/1918 | Brinser |

(Continued)

FOREIGN PATENT DOCUMENTS

| | | |
|---|---|---|
| CA | 813195 | 5/1969 |
| CA | 961420 | 1/1975 |

(Continued)

*Primary Examiner* — William E Dondero
*Assistant Examiner* — Robert T Reese
(74) *Attorney, Agent, or Firm* — Lowe Graham Jones PLLC

(57) ABSTRACT

In various embodiments, the invention provides a lubricator comprising a housing defining, a main lubricant chamber adapted to contain a fluid lubricant. A piston pump in fluid communication with the main lubricant chamber may be adapted to be driven to discharge the lubricant from a pump changer through a lubricant outlet in the housing. A check valve may be mounted on the lubricant outlet, to check the discharge of lubricant from the lubricator. The lubricator may include a motor having a drive shaft adapted to rotate a swash plate to act as a cam to drive reciprocating motion of the pump piston in the pump chamber. The drive shaft may be in axial alignment with the piston, the swash plate being set obliquely on the drive shaft to revolve when the motor is activated to give reciprocating motion to the piston in a direction parallel to the driven shaft. The piston may be biased in the pump chamber against the swash plate, so that the swash plate rides on the piston.

18 Claims, 6 Drawing Sheets

(56) References Cited

U.S. PATENT DOCUMENTS

| | | | |
|---|---|---|---|
| 1,561,308 A | 11/1925 | Brown | |
| 1,696,774 A | 12/1928 | Martin | |
| 1,720,398 A | 7/1929 | Harrigan | |
| 1,813,183 A | 7/1931 | Mathewson | |
| 1,834,321 A | 12/1931 | Tervo | |
| 1,878,115 A | 9/1932 | De Cosse | |
| 1,905,913 A | 4/1933 | Kopp | |
| 1,996,929 A | 4/1935 | Mays | |
| 2,566,702 A | 9/1951 | Harrigan | |
| 2,877,935 A | 10/1953 | Sherbondy | |
| 2,694,508 A | 11/1954 | Petrenchak | |
| 2,731,173 A | 1/1956 | Harrigan | |
| 2,754,931 A | 7/1956 | Riker | |
| 2,807,215 A | 9/1957 | Hawxhurst | |
| 2,823,768 A * | 2/1958 | Taylor | 184/7.2 |
| 2,852,098 A | 9/1958 | Benson | |
| 2,899,017 A | 8/1959 | Liljemark | |
| 2,924,359 A | 2/1960 | Bereman | |
| 2,954,845 A * | 10/1960 | Minera | 184/37 |
| 2,979,879 A | 4/1961 | Studhalter et al. | |
| 2,984,188 A | 5/1961 | Tuckey et al. | |
| 3,115,280 A | 12/1963 | Battista | |
| 3,214,067 A | 10/1965 | Linington | |
| 3,244,333 A | 4/1966 | Kohn et al. | |
| 3,424,022 A | 1/1969 | Greenberg et al. | |
| 3,430,731 A | 3/1969 | Satzinger | |
| 3,608,672 A | 9/1971 | Dandridge | |
| 3,622,048 A | 11/1971 | Batlas | |
| 3,774,721 A | 11/1973 | Hollowell | |
| 3,815,787 A | 6/1974 | Spies | |
| 3,822,607 A | 7/1974 | Tharaldsen | |
| 3,842,939 A | 10/1974 | Satzinger | |
| 3,983,959 A | 10/1976 | Satzinger | |
| 3,984,033 A | 10/1976 | Groth et al. | |
| 3,987,869 A | 10/1976 | Bowers | |
| 4,006,797 A | 2/1977 | Keske | |
| 4,023,648 A | 5/1977 | Orlitzky et al. | |
| 4,171,072 A | 10/1979 | Davis, Jr. | |
| 4,257,540 A | 3/1981 | Wegmann et al. | |
| 4,286,691 A | 9/1981 | Stong | |
| 4,328,843 A | 5/1982 | Fujii | |
| 4,640,445 A | 2/1987 | Yamada | |
| 4,671,386 A | 6/1987 | Orlitzky | |
| 4,711,320 A | 12/1987 | Dombroski et al. | |
| 4,744,442 A | 5/1988 | Bras et al. | |
| 4,770,613 A | 9/1988 | Hoover et al. | |
| 4,799,574 A | 1/1989 | Bras | |
| 4,836,334 A | 6/1989 | Bras | |
| 4,941,550 A | 7/1990 | Blake | |
| 5,012,897 A | 5/1991 | Jorissen | |
| 5,105,912 A | 4/1992 | Heister | |
| 5,125,480 A | 6/1992 | Gregory et al. | |
| 5,181,585 A | 1/1993 | Braun et al. | |
| 5,242,033 A | 9/1993 | Toraason | |
| 5,242,565 A | 9/1993 | Winsel | |
| 5,271,528 A | 12/1993 | Chien | |
| 5,285,871 A | 2/1994 | Sievenpiper | |
| 5,354,264 A | 10/1994 | Bae et al. | |
| 5,404,966 A | 4/1995 | Yang | |
| 5,409,084 A | 4/1995 | Graf | |
| 5,417,308 A | 5/1995 | Hartl | |
| 5,423,454 A | 6/1995 | Lippman et al. | |
| 5,427,870 A | 6/1995 | Joshi et al. | |
| 5,460,242 A | 10/1995 | Graf | |
| 5,538,605 A | 7/1996 | Joshi et al. | |
| 5,547,043 A | 8/1996 | Graf et al. | |
| 5,567,287 A | 10/1996 | Joshi et al. | |
| 5,573,646 A | 11/1996 | Saito et al. | |
| 5,593,552 A | 1/1997 | Joshi et al. | |
| 5,622,239 A | 4/1997 | Orlitzky | |
| 5,634,531 A | 6/1997 | Graf et al. | 184/37 |
| 5,667,037 A | 9/1997 | Orlitzky | |
| 5,728,487 A | 3/1998 | Gratzel et al. | |
| 5,732,794 A | 3/1998 | Orlitzky et al. | |
| 5,785,688 A | 7/1998 | Joshi et al. | |
| 5,921,350 A | 7/1999 | Tsai | |
| 5,968,325 A | 10/1999 | Oloman et al. | |
| 5,971,229 A | 10/1999 | May et al. | |
| 6,012,551 A | 1/2000 | Raab | 184/7.4 |
| 6,101,427 A | 8/2000 | Yang | |
| 6,189,656 B1 | 2/2001 | Morgenstern et al. | |
| 6,244,387 B1 * | 6/2001 | Paluncic et al. | 184/37 |
| 6,299,743 B1 | 10/2001 | Oloman et al. | |
| 6,408,985 B1 | 6/2002 | Orlitzky | |
| 6,675,992 B2 | 1/2004 | Schumann | |
| D490,671 S | 6/2004 | Hung | |
| 6,802,394 B2 | 10/2004 | Patterson et al. | |
| 6,835,298 B2 | 12/2004 | Oloman et al. | |
| D510,242 S | 10/2005 | Chen | |
| D523,303 S | 6/2006 | Amin | |
| 7,104,116 B2 | 9/2006 | Discenzo | |
| 7,168,595 B2 | 1/2007 | Ling | |
| 7,228,941 B2 | 6/2007 | Weigand et al. | |
| 7,275,420 B2 | 10/2007 | Discenzo | |
| 7,306,711 B2 | 12/2007 | Oloman et al. | |
| 7,429,315 B2 | 9/2008 | Oloman et al. | |
| 2004/0197040 A1 | 10/2004 | Walker et al. | |
| 2004/0250623 A1 | 12/2004 | Walker et al. | |
| 2005/0137763 A1 | 6/2005 | Watkins et al. | |
| 2007/0108045 A1 | 5/2007 | Oloman | |
| 2008/0060879 A1 | 3/2008 | Orlitzky et al. | |
| 2009/0192728 A1 | 7/2009 | Wright et al. | |
| 2009/0228239 A1 | 9/2009 | Inoue et al. | |

FOREIGN PATENT DOCUMENTS

| | | |
|---|---|---|
| CA | 1280700 | 2/1991 |
| CA | 1333579 | 12/1994 |
| CA | 2159293 | 3/1996 |
| CA | 2 299 490 | 8/2001 |
| CA | 2635788 | 11/2008 |
| CH | 166690 | 3/1934 |
| CH | 567679 | 10/1975 |
| DE | 25435 | 12/1897 |
| DE | 343551 | 11/1921 |
| DE | 1256001 | 12/1967 |
| DE | 2013504 | 10/1970 |
| DE | 2157670 | 5/1973 |
| DE | 3530212 | 10/1986 |
| DE | 36 33 895 | 4/1988 |
| DE | 37 18 342 | 9/1988 |
| DE | 3718342 | 9/1988 |
| DE | 37 18 357 | 11/1988 |
| DE | 3718357 | 11/1988 |
| DE | 37 18 341 | 12/1988 |
| DE | 3718341 | 12/1988 |
| DE | 37 26 473 | 2/1989 |
| DE | 3726473 | 2/1989 |
| DE | 38 11 468 | 10/1989 |
| DE | 38 11 469 | 10/1989 |
| DE | 3811468 | 10/1989 |
| DE | 3811469 | 10/1989 |
| DE | 39 24 118 | 1/1991 |
| DE | 3924118 | 1/1991 |
| DE | 93 09 575 | 10/1993 |
| DE | 44 05 006 | 8/1994 |
| DE | 19711605 | 6/1998 |
| DE | 100 65 762 | 7/2002 |
| DE | 101 19 688 | 11/2002 |
| EP | 0 581 795 | 2/1994 |
| EP | 926426 | 10/1998 |
| EP | 0 982 527 | 3/2000 |
| EP | 1052445 A1 | 11/2000 |
| EP | 1686361 A2 | 12/2005 |
| EP | 1 756 467 | 2/2007 |
| EP | 2101102 | 3/2009 |
| EP | 2101102 A2 | 9/2009 |
| GB | 229318 | 12/1925 |
| GB | 561250 | 5/1944 |
| GB | 691226 | 5/1953 |
| GB | 845933 | 8/1960 |
| GB | 901161 | 7/1962 |
| GB | 2195713 | 4/1988 |
| GB | 200416577 | 7/2004 |

(56) References Cited

FOREIGN PATENT DOCUMENTS

| | | |
|---|---|---|
| IT | 347340 | 4/1937 |
| JP | 64-19193 | 7/1987 |
| JP | 63203993 | 8/1988 |
| JP | 3-51569 | 7/1989 |
| JP | 6-248926 | 2/1993 |
| JP | 8-15289 | 6/1994 |
| JP | 10-019193 A | 1/1998 |
| JP | A-10-019193 | 1/1998 |
| JP | 11-512785 | 11/1999 |
| JP | 11-512785 T | 11/1999 |
| JP | 2005-90644 | 9/2003 |
| KR | 10-0055954-0000 | 5/1992 |
| KR | 1992-0004472 | 6/1992 |
| SU | 316415 | 12/1971 |
| SU | 1710890 | 2/1992 |
| TW | 247925 | 5/1995 |
| WO | 89/09884 | 10/1989 |
| WO | WO 92/19571 | 11/1992 |
| WO | WO 97/13007 | 4/1997 |
| WO | WO 01/33133 | 5/2001 |
| WO | PCT/CA2005/000705 | 5/2005 |
| WO | WO 2005/108850 | 11/2005 |
| WO | 201125430 | 3/2011 |

\* cited by examiner

AUTOMATIC MOTOR DRIVEN IN-LINE PISTON PUMP LUBRICATOR

CROSS REFERENCE TO RELATED APPLICATIONS

This U.S. National Stage of Patent Cooperation Treaty Application Serial No. PCT/CA2005/000705 filed May 6, 2005 claims the benefit of the filing date of prior filed, U.S. Provisional Application Ser. No. 60/568,267 filed on May 6, 2004.

FIELD OF THE INVENTION

The invention relates to methods and apparatus for automatic lubrication of machinery, particularly bearings, that have fittings thereon adapted to receive a quantity of grease or similar lubricant, and more specifically to methods and apparatus that involve a selectable scheduling of lubrication and the active transport of a lubricant, especially by a cam-pump device, that will then inject such lubricant through such fittings into particular machinery that has been connected thereto.

BACKGROUND OF THE INVENTION

Lubricators that utilize compressed air, compressed springs, motor driven jack screws, augers or a gas generating cartridge as a driving force to eject lubricant into a machine are known in the prior art. For example, U.S. Pat. No. 4,023,648 to Orlitzky et al. describes a lubricant applicator that electrolytically generates a gas as a driving means to force lubricant out of a chamber into a bearing fitting. U.S. Pat. No. 4,671,386 to Orlitzky describes an applicator in which the required pressure is delivered by a bellows. Automatic control of the lubricating process is shown in U.S. Pat. No. 6,408,985 to Orlitzky et al., which describes a programmable, electrical motor-driven lubricator that in different embodiments forces lubricant from a chamber by the operation of a gear-driven or lever-driven piston, or by a bellows. U.S. Pat. No. 5,732,794 to Orlitzky et al, describes an automated lubricator which is microprocessor controlled and can be programmed to deliver lubricant to a bearing or the like at selected intervals. Operation of the lubricator rests upon the use of a minor pressure imposed by a spring to force lubricant into the threads of an auger, so that rotation of the auger by a motor controlled by the microprocessor then dispenses the lubricant while at the same time providing a mixing action to the lubricant.

There remains a need for portable lubricators capable of supplying a quantity of lubricant quickly, and capable of maintaining a controlled quantity of lubricant over a range of back pressures and ambient temperatures. In some devices, if the back pressure is too high, or the temperature is too low, substantial time may elapse before the lubricant reaches the machinery intended to be lubricated, such as a bearing, and the latter may then become starved for lubricant and suffer damage accordingly. In some gas generating cells, for example, it may take several days to overcome a line resistance of 15 psi before the lubricant actually reaches the point of lubrication. Conversely, under high temperature conditions there is the opposite danger of overlubricating which can also be damaging.

SUMMARY OF THE INVENTION

In various embodiments, the invention provides a lubricator comprising a housing defining a main lubricant chamber (or alternative means for containing a fluid lubricant). The lubricant chamber may be adapted to contain a fluid lubricant. The housing may have a lubricant outlet for discharging the lubricant from the lubricator. The lubricator may include a piston pump in fluid communication with the main lubricant chamber (or alternative means for pumping the lubricant in fluid communication with the main lubricant chamber). The piston pump may include a pump chamber adapted to receive lubricant from the main lubricant chamber. The lubricator may include a main chamber piston biased in the housing to urge the lubricant from the main lubricant chamber into the pump chamber. The piston pump may further include a pump piston adapted to be driven to discharge the lubricant from the pump chamber through a lubricant outlet in the housing. A check valve may be mounted on the lubricant outlet, to check the discharge of lubricant from the lubricator when the piston pump is not driven. The lubricator may include a motor for driving the piston pump (or alternative means for driving the piston pump). The motor may have a drive shaft adapted to rotate a swash plate to act as a cam to drive reciprocating motion of the pump piston in the pump chamber. The drive shaft may be in axial alignment with the piston, the swash plate being set obliquely on the drive shaft to revolve when the motor is activated to give reciprocating motion to the piston in a direction parallel to the drive shaft. The piston may be biased in the pump chamber against the swash plate, so that the swash plate rides on the piston.

Electronic controls may be provided in some embodiments for regulating the activation of the motor to control the discharge of the lubricant from the lubricator (or alternative means for regulating the discharge of the lubricant from the lubricator). The electronic controls may include an input for setting the rate of discharge of the lubricant from the lubricator.

DETAILED DESCRIPTION OF THE INVENTION

In some aspects, the invention comprises a portable device for single point or multiple point lubrication that includes a container having an outlet to be connected to the lubricating system of the machinery; a cam-pump lubricant dispensing mechanism between the container and the outlet. In selected embodiments, such a device may be adapted to produce relatively high pressure using a relatively small DC powered motor using a relatively small current draw (e.g. 0.500 amperes at 6 volts DC for 1200 psi). Selected embodiments may be made to be customer refillable using ordinary grease guns. Exemplary embodiments are illustrated herein, and described below, on the understanding that alternative embodiments may be implemented in keeping with the general scope of the invention as claimed.

Figure 1:
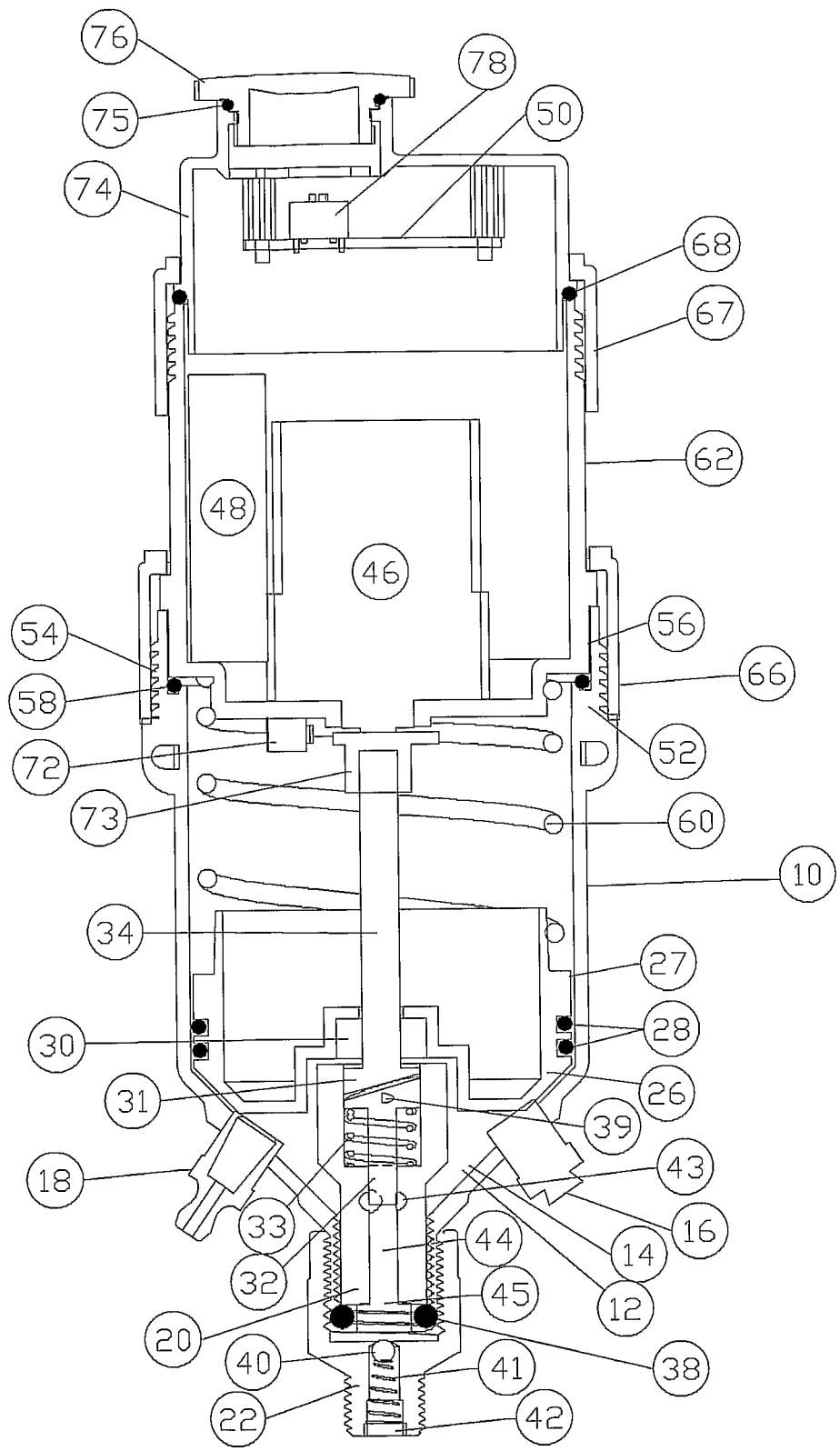
FIG. 1 is a cross-sectional drawing of a lubricator in vertical elevation.

FIG. 1 depicts in vertical elevation a cross-sectional drawing of a lubricator 10 constructed within a cylindrical, elongated chamber 12. The lower portion of chamber 12 is generally V-shaped with a hollow interior, thus permitting placement therein of a quantity of grease or lubricant 14. On the sides of the V-shaped portion there is installed on one side a pressure relief valve 16, and typically on the opposite site thereof is a zirk or alamite fitting 18 through which lubricant 14 can be introduced into chamber 12.

In the region of lubricator 10 on the side of piston 26 opposite that part of chamber 12 that contains lubricant 14, DC motor 46 attaches axially to limit switch actuator 73, which attaches axially to central shaft 34, which attaches axially to driving pump swash plate/cam 31 and provides the rotational movement of the same so as to rotate driving swash plate/cam 31. (as hereafter described). Limit switch actuator 73 activates limit switch 72 once per revolution, providing a revolution counter to circuit board 50. Power for DC motor 46 derives from battery pack 48 constructed of 4 1.5V alkaline batteries sold under the trade name of Energizer Titanium X91 or similar. The batteries are connected in series to provide a nominal 6VDC. The motor, battery pack and limit switch all connect to circuit board 50 via convenient plugs for ease of replacement. Using batteries of the type indicated in battery pack 48, it is found that in normal operation a chamber 12 containing 125 cc of lubricant 14 can be emptied out two times before battery replacement becomes necessary, i.e. a single battery pack 48 will provide enough power to dispense 250 cc of lubricant.

Battery pack 48 is disposed within lubricator 10 in motor housing 62 that extends basket-like on either side of DC motor 46, and control of DC motor 46 is provided from circuit board 50, which is conveniently located adjacent thereto. More specifically, circuit board 50 is square shaped and is attached to circuit board housing 74, disposed so as the DIP switch array 78 is accessible through the opening covered by switchcap 76. O-ring 75 maintains a tight seal between circuit board housing 74 and switchcap 76. Circuit board housing 74 is located on the open end of motor housing 62 and held in place by an external toroidal locking rim 67 which threadably attaches to motor housing 62. O-ring 68 maintains a tight seal between motor housing 62 and circuit board housing 74.

In the region of lubricator 10 which includes DC motor 46, battery pack 48 and circuit board 50, chamber 12 is extended outwardly by a circular rim 52 that has external threads 54 and inwardly therefrom a toroidal cavity 56 containing at the bottom thereof an O-ring 58. Disposing inwardly from toroidal cavity 56 is a toroidal spring 60, the lower surface of which abuts the upper surface of outer side wall 27 of piston 26. Motor housing 62 also extends outwardly to the periphery of the interior of lubricator 10 so as to rest upon the upper surface of toroidal spring 60 and compress the same. The strength of toroidal spring 60 is preferably adapted to provide a downward force against piston 26 that will produce a pressure of about 7 psi against lubricant 14, thereby providing a relatively mild pressure which suffices to force lubricant 14 into pump chamber 44 via pump housing lubricant holes 43. As hereafter described, it is the downward action of piston pump 32 which actually forces lubricant 14 to be expelled from lubricator 10, and not any pressure as such on the bulk of lubricant 14. It may now be noted that motor housing 62 is held in the position aforesaid by an external, toroidal locking rim 66 which threadably attaches to circular rim 52.

Threaded into the bottom end of chamber 12 is an externally threaded pump housing 20, typically of ½ inch size. The outlet of chamber 12 is externally threaded to ½ inch NPT. Threaded onto the outlet of chamber 12 is check valve assembly 22, which has ½ inch NPT internal threads and an extension having ¼ inch exterior threads for convenient attachment to a grease fitting on a bearing or the like. Inserted into check valve assembly 22 is check ball 40 which is kept seated by spring 41, which is kept in place by retainer 42.

Above lubricant 14 is piston 26 having a tubular upwardly extending outer side wall 27 which encircles the interior of chamber 12, the external periphery of outer side wall 27 being in close contact with the interior surface of chamber 12 and having disposed therein a set of piston o-rings 28 for maintaining a tight seal thereto. Piston 26 is further adapted to accommodate about the central vertical axis thereof a toroidal piston cup seal 30 through the center of which passes a central shaft 34. Piston cup seal 30 ensures a tight seal between central shaft 34 and piston 26 above lubricant 14.

Attached to central shaft 34 is driving pump swash plate/cam 31 which rides on driven pump piston 32. Return spring 33 is located between pump housing 20 and pump piston 32. (as hereinafter described).

Figure 2A:
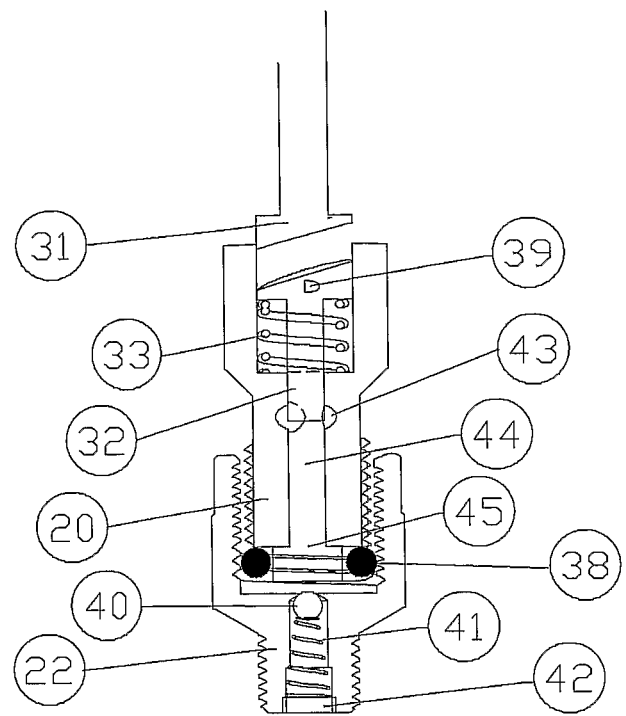
FIG. 2A shows a piston pump of the invention broken away in vertical cross section.

As shown in greater detail in FIG. 2A, pump housing 20 further comprises a set of holes 43 therein at points within the region of chamber 12 containing lubricant 14, which permits passage of portions of lubricant 14 into the pump chamber 44 of pump housing 22. Rotation of central shaft 34 rotates driving pump swash plate/cam 31, which causes pump piston 32 to move downwards, compressing spring 33 and transporting such quantity of lubricant 14 that has entered the pump chamber 44 outwardly through pump chamber opening 45. When the lubricant pressure in the pump chamber opening 45 has overcome the resistance of check ball spring 41, then check ball 40 moves downward, allowing the lubricant 14 to pass by check ball 40 and into the grease fitting or grease line (not shown) to which check valve assembly 22 has been connected. When piston pump 32 reaches the bottom of its travel, spring 33 is compressed. As driving pump swash plate/cam 31 continues to rotate, spring 33 forces pump piston 32 to move upwards back to its starting location. As it moves upwards, a vacuum is created in pump chamber 44. When pump piston 32 has cleared pump housing holes 45, lubricant 14 enters pump chamber 44. As pump piston 32 moves upward, the pressure in pump chamber 44 decreases, which allows check ball spring 41 to seal check ball 40 into check valve assembly 22, which prevents grease from returning into pump chamber 44 from the grease fitting, Guide pin 39 travels in a longitudinal motion which prevents pump piston 32 from rotating. O-ring 38 maintains a tight seal between pump housing 20 and check valve assembly 22. This action repeats itself under control of circuit board 50.

Figure 2B:
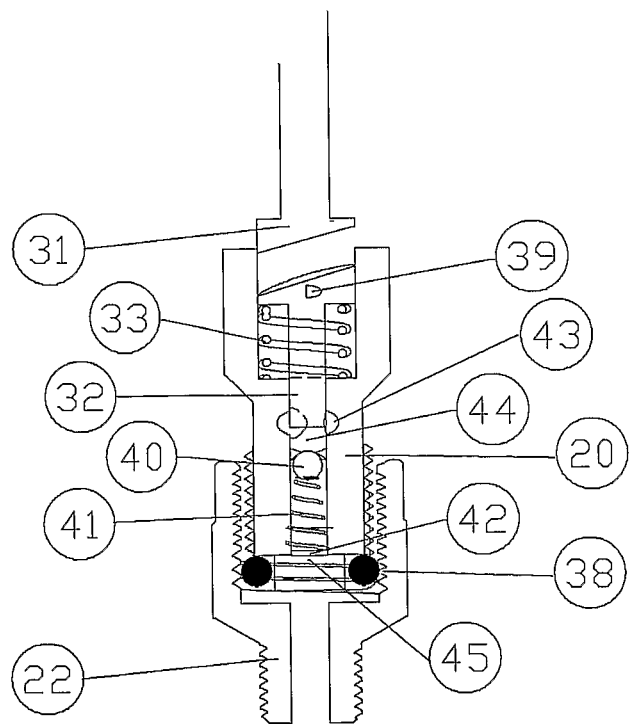
FIG. 2B shows an alternate piston pump of the invention broken away in vertical cross section.

FIG. 2B shows the an alternate embodiment of the pump. In this embodiment, check ball 40, spring 41, and retainer 42 are moved from check valve assembly 22 and installed in the bottom of the pump housing 20. The operation does not change. Check valve assembly 22 in this embodiment is an adapter with ½ inch NPT internal threads and an extension having ¼ inch exterior threads for convenient attachment to a grease fitting on a bearing or the like.

Figure 2C:
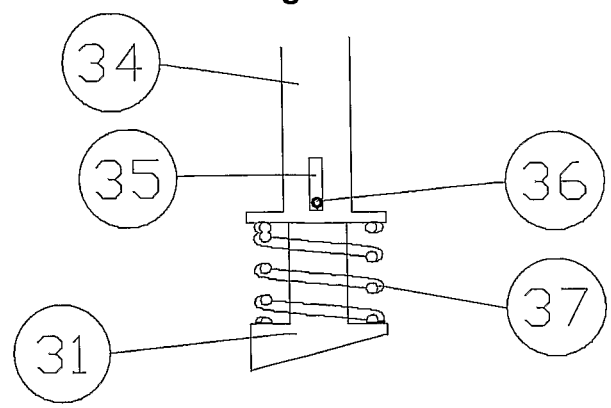
FIG. 2C shows an alternate embodiment of a drive shaft swash plate assembly of the invention, broken away in vertical cross section.

FIG. 2C shows an alternate embodiment of the driving pump swash plate/cam 31. This embodiment functions to limit the pressure generated by pump piston 32. In this embodiment, all functions of lubricator 10 operate as heretofore described. The additional features of the embodiment of FIG. 2C operate as follows. As the pressure increases in pump chamber 44, pump piston 32 requires more force when traveling in a downward action to compress lubricant 14. When the pressure in pump chamber 44 reaches a specific value (maximum pressure), overpressure spring 37 will start to compress. The maximum pressure is determined by the resistance of spring 37. When overpressure spring 37 compresses, driving pump swash plate/cam 31 will travel upward into central shaft 34. Guide pin 36 travels in a longitudinal motion in guide pin slot 35, which prevents driving pump swash plate/cam 31 from rotating or becoming disconnected from central shaft 34. When driving pump swash plate/cam 31 travels upward into central shaft 34, the downward travel of pump piston 32 is reduced, which reduces the pressure developed in pump chamber 44. This embodiment may also be adapted to provide compensation for expansion or contraction of components due to temperature changes.

Figure 2D:
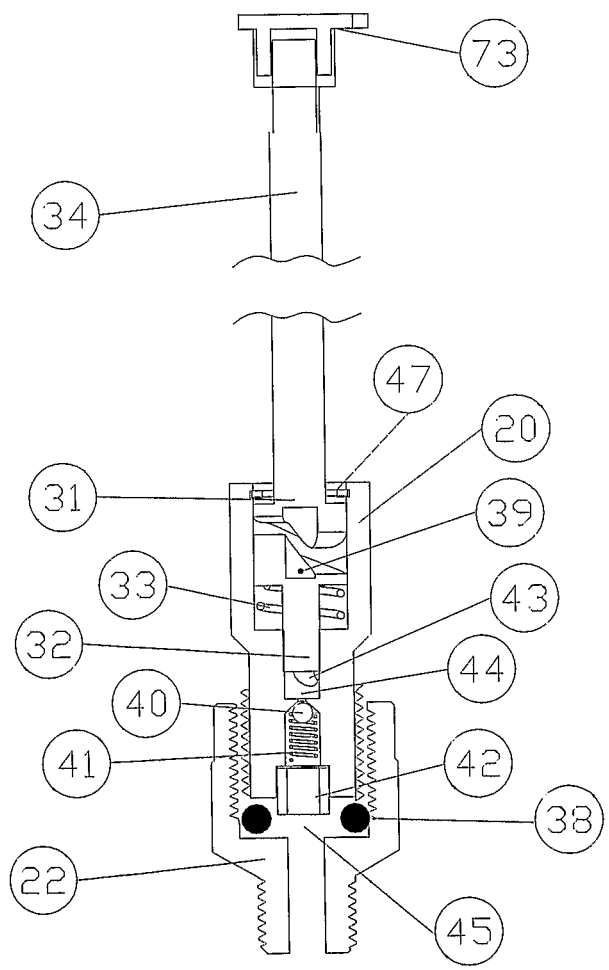
FIG. 2D shows an additional alternate embodiment of a drive shaft swash plate assembly of the invention, broken away in vertical cross section.

FIG. 2D shows an alternate embodiment of the pump. In this embodiment, retainer 47 maintains the position of driving pump swash plate/cam 31 and accurately positions pump piston 32 in relation to the pump housing 20. Limit switch actuator 73 is modified to allow central shaft 34 to float in/out of actuator 73, its position determined by the location of the pump assembly 20. This mechanism may be adapted to provide temperature compensation to maintain consistant pump output over a temperature range. As cylinder 10 stretches in the heat, pump assembly 20 will travel away from actuator 73, creating a larger gap inside actuator 73 above central shaft 34. As cylinder 10 compresses when it cools, pump assembly 20 will travel toward actuator 73, decreasing the gap inside actuator 73. In this way, pump piston 32 will always remain stable in relation to pump housing 20.

Figure 4:
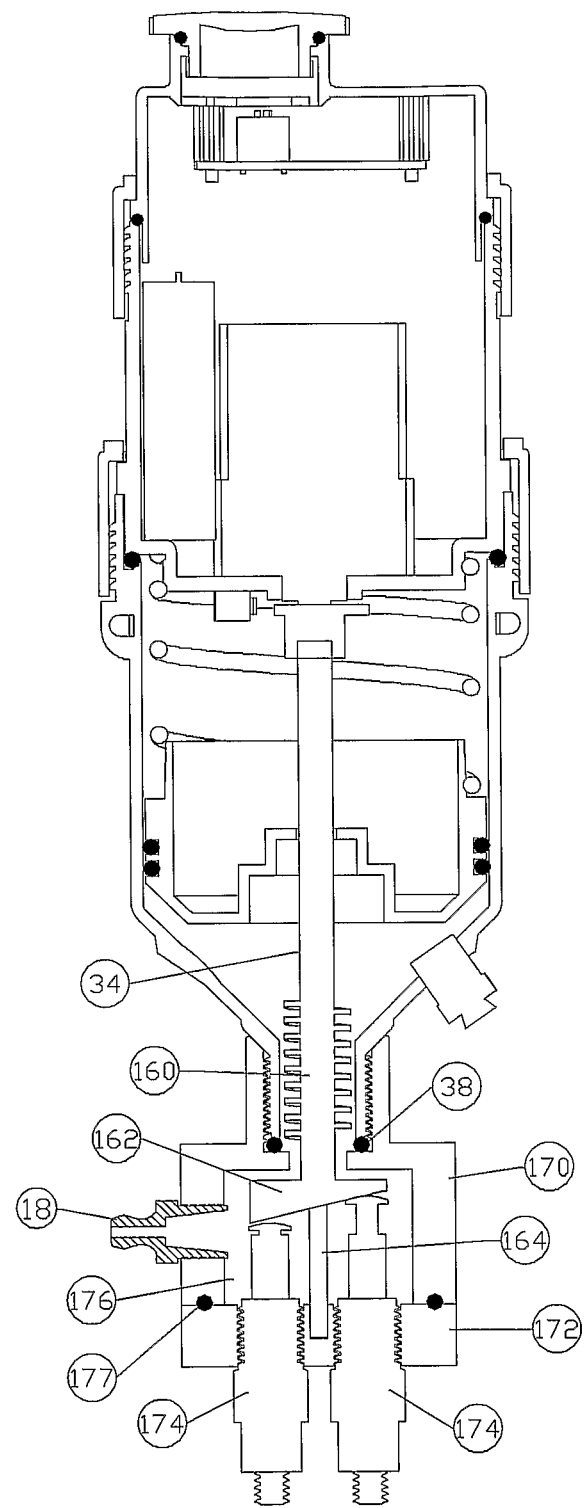
FIG. 4 is a cross-sectional drawing of an alternate lubricator in vertical elevation, showing multiple lubricant outlets, each comprising a pump element mounted to the pump housing end plate.
Figure 5:
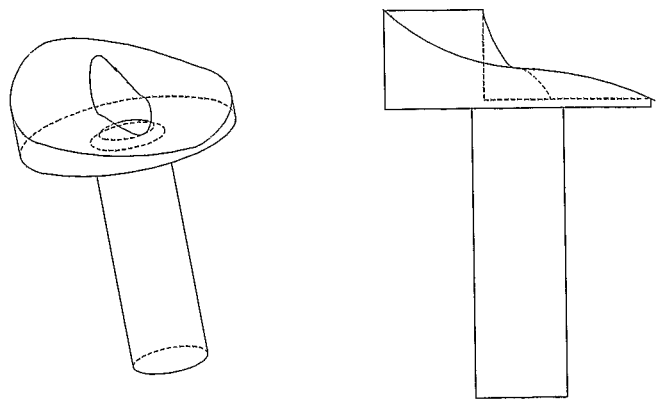
FIG. 5 is a detailed illustration of one embodiment of a swash plate of the invention.

FIG. 4 shows an alternate embodiment of the lubricator. In this embodiment there are multiple lubricant outlets, each consisting of a pump element 174 mounted to the pump housing end plate 172. For clarity, FIG. 4 shows only two pump elements, whereas in alternative embodiments there may be a plurality of pump elements of three or more.

Threaded onto the outlet of chamber 12 is pump housing 170. O-ring 38 ensures a tight seal between lubricator 10 and pump housing 170. Pump housing end plate 172 is attached to the open end of pump housing 170 using threaded screws (or alternative fasteners). O-ring 177 ensures a tight seal between pump housing 170 and pump housing end plate 172. Pump elements 174 are threaded, or otherwise attached, onto pump housing end plate 172, Pump elements 174 may for example be selected from commercially available pump elements, comprising a spring loaded piston pump and a check valve.

In the embodiment of FIG. 4, attached axially to central shaft 34 is the progressive displacement auger 160. Attached axially to progressive displacement auger 160 is swash plate/cam 162, and attached axially to swash plate/cam 162 is swash plate locating pin 164. The bottom end of swash plate locating pin 164 terminates in pump housing end plate 172.

In the embodiment of FIG. 4, rotation of central shaft 34 rotates progressive displacement auger 160 which remixes and pushes lubricant 14 from chamber 12 into pump housing chamber 176, creating a positive pressure in pump housing chamber 176, helping to ensure that lubricant is available at all times to pump elements 174. Rotation of central shaft 34 rotates swash plate/cam 162, which causes pump elements 174 to compress. The compression of pump elements 174 transports lubricant outwardly from pump housing chamber 176 into the grease fitting or grease line (not shown) which is attached to the outlet of pump element 174. Lubricant is introduced into pump housing chamber 176 and chamber 12 through zirk or alamite fitting 18.

Figure 3:
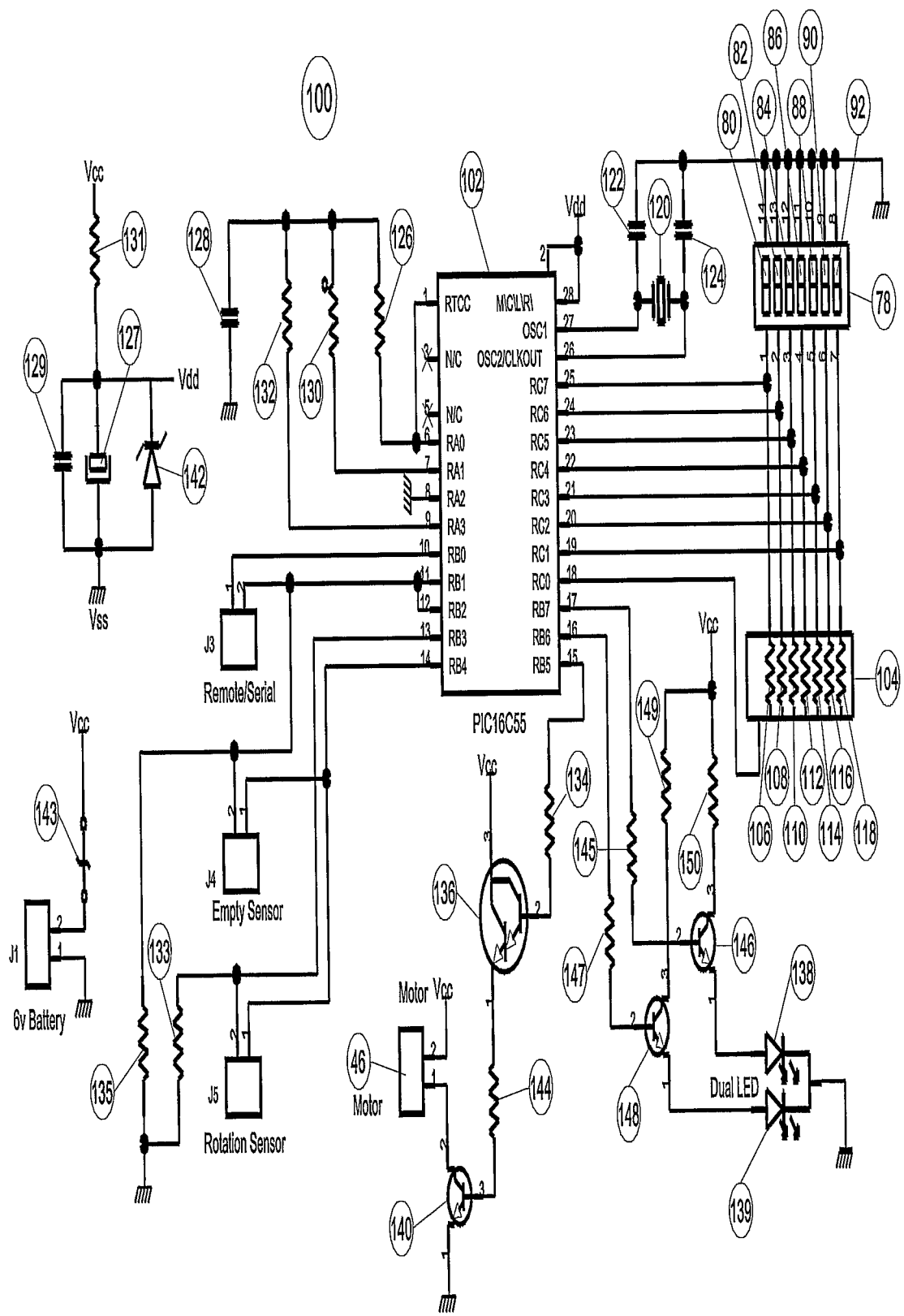
FIG. 3 is a schematic diagram of one embodiment of a circuit on circuit board providing electronic controls for the lubricator of the invention.

FIG. 3 is a diagram of one embodiment of a circuit incorporated on circuit board 50. Circuit 100 serves to control the times of dispensation of lubricant by lubricator 10, i.e. the times of operation of DC motor 46 which causes rotation of central shaft 34 and hence disposition of lubricant as previously described. Since particular embodiments of the invention may be placed in applications that have a wide range of different conditions of back pressure, bearing demands and the like, circuit 100 includes provisions for varying the timing of such lubricant dispensation.

Circuit 100 includes switch array 78 and switches 80-92 in schematic form. Switch array 78 includes terminals connecting to one side of each of switches 80-92, said terminals on the switch array being respectively numbered 8-14 and in circuit 100 all are connected to ground.

Circuit 100 further comprises resistor array 104 containing a set of thirteenth-nineteenth resistors 106-118, each of which preferably has a resistance of about 1 MΩ. The sides of switches 80-92 opposite their previously noted terminals connecting to ground have external terminals that are numbered on switch array 78 as 7, 6, 5, 4, 3, 2, and 1 respectively, and connect therethrough to proximal ends of thirteenth-nineteenth resistors 106-118, respectively. The distal ends of thirteenth-nineteenth resistors 106-118 are mutually interconnected and connect also to terminal 18 of microprocessor (MP) 102, which constitutes the RC0 terminal thereof.

Thirteenth-nineteenth resistors 106-118 provide a pull-up resistive network for the switch inputs to MP 102. That is, in addition to the aforesaid connections to thirteenth-nineteenth resistors 106-118, terminals 7, 6, 5, 4, 3, 2, and 1, connect to MP 102 as shown in Table 1.

TABLE 1

| Array 78 | 7 | 6 | 5 | 4 | 3 | 2 | 1 |
|---|---|---|---|---|---|---|---|
| MP 102 | 19 | 20 | 21 | 22 | 23 | 24 | 25 |
| Input | RC1 | RC2 | RC3 | RC4 | RC5 | RC6 | RC7 |

In Table 1, the first row represents the terminals of switch array 78, the second row represents the terminals of MP 102 to which the terminals in the same column of the first row connect, and the third row gives the standard notation for the aforesaid input terminals of MP 102.

MP 102 is preferably an EPROM such as the PIC16C55A manufactured by Microchip Technology Inc., i.e., a known type that can easily be programmed by a person of ordinary skill in the art. The power for MP 102 is provided by a connection to the MCLR input (terminal 28) thereof to VDD (as produced in a separate circuit described hereinafter). An oscillator circuit for timing the operation of lubricator 10 is made up of crystal 120 which connects on either side thereof to ground through first and second capacitors 122 and 124 (each about 22 pf) and also on either side thereof to terminals 26 and 27 of MP 102 labeled as "OSC2" and "OSC1". Crystal 120 is preferably of a low power consumption type, and operates at a frequency of about 32.768 kHz. The RA0 and RTCC connections of MP 102 which are respectively terminals 6 and 1 thereof connect through sixth resistor 126 and then third capacitor 128 to ground. The RA1 terminal of MP 102 (terminal 7) connects through seventh resistor 130 to that same third capacitor 128 and thence to ground, and similarly the RA3 terminal of MP 102 (terminal 9) connects through fifth resistor 132 through third capacitor 128 to ground.

Seventh resistor is preferably a U.S. Sensors thermistor (e.g. of the type 105RG1K), the measured resistance (Rm) of which is used to sense the device temperature on the basis of which the operation of lubricator 10 can be terminated. Seventh resistor 130 constitutes a part of a capacitive charging circuit that also includes sixth resistor 126, third capacitor 128, and fifth resistor 132. Sixth resistor 126 has a small resistance of about 100Ω and serves to limit current through terminal 6 (RA0) of MP 102. Through terminal 9 (RA3) of MP 102 a reference voltage Vr (e.g. VDD at 3.6 volts) is applied to fifth resistor 132 (Rc) so that third capacitor 128 (about 0.01 uf commences charging to a threshold voltage Vt (e.g. 2.5 volts), and a reference value Tc for the time of charging is stored in the MP 102 memory. Fifth resistor 132 will have a calibration resistance Rc of about 1 MΩ, but in any case Rc cannot exceed the resistance of seventh resistor 130 (i.e. the thermistor). After discharge of third capacitor 128 under the control of MP 102, reference voltage Vr is applied to seventh resistor 130 and the charging time Tm in passing current through seventh resistor 130 is determined so as to yield the resistance value Rm thereof in accordance with the formula Rm=(Tm/Tc) Rc. On the basis of lookup tables stored in MP 102, the temperature of seventh resistor 130 can be ascertained, or preferably the temperature dependant Rm value can be used to trigger a selected shut-off of circuit 100. MP 102 is thus programmed by standard "burn-out" methods such that with the aforesaid resistance and capacitance values so selected, at a temperature of about −10 degrees Celsius seventh resistor 130 will have a resistance value Rm that will disable DC motor 46 run pin 15 (RB5) of MP 102 as discussed below.

The further connections of MP 102 that serve to operate DC motor 46 are found at the RB5 terminal thereof (terminal 15) which connects through tenth resistor 134 (e.g. 27 kΩ) to the base of third BJ transistor 136. The collector of third BJ transistor 136 connects to VCC. The emitter of third BJ transistor 136 connects through eleventh resistor 144 (e.g. 100Ω) to the base of forth BJ transistor 140, while the emitter of forth BJ transistor 140 connects to ground directly.

First resistor 150 (e.g. 1 KΩ) connects between Vcc and the collector of BJ transistor 146 of the 2N3904 type and serves as a pull-up resistor. The base of BJ transistor 146 is connected to terminal 17 (RB7) of MP 102 through eighth resistor 145 (e.g. 27KΩ). The emitter of BJ transistor 146 connects to green LED 138 which is connected to ground. Second resistor 149 (e.g. 1KΩ) connects between Vcc and the collector of BJ transistor 148 of the 2N3904 type and serves as a pull-up resistor. The base of BJ transistor 148 is connected to terminal 16 (RB6) of MP 102 through ninth resistor 147 (e.g. 27KΩ). The emitter of BJ transistor 148 connects to red LED 139 which is connected to ground. Under MP 102 program control, the green and red LED's are used to indicate operation and status conditions of the lubricator 10.

Third resistor 133 (e.g. 10KΩ) connects between MP 102 terminal 13 (RB3), pin 2 of the rotation sensor plug and ground, and is a pull-down resistor. Terminal 14 (RB4) of MP 102 connects to pin 1 of the rotation sensor plug. Limit switch 72 is connected to circuit board 50 via the rotation sensor plug. Forth resistor 135 (e.g. 10KΩ) connects between MP 102 terminal 11 (RB1), terminal 12 (RB2), pin 2 of the empty sensor plug, pin 2 or the remote/serial plug, and ground, and is a pull-down resistor. Terminal 13 (RB3) of MP 102 connects to pin 1 of the empty sensor plug. Terminal 10 (RB0) of MP 102 connects to pin 1 of the remote/serial plug. The remote/serial plug and the empty sensor plugs are used for inputting the status of future signals to the MP 102 microprocessor.

In operation, through the internal programming of MP 102, turning on the MP 102 output RC0 (terminal 18) connects any of the switches 80-92 which are off to VDD. Any of the switches 80-92 which are on connect the input to MP 102 to ground, thereby making the status of switches 80-92 inputs to the particular lines of MP 102 (RC1-RC7). This permits an output to be generated on the MP 102 output line RB5 through tenth resistor 134 to the base connection of BJ transistor 136, turning on BJ transistor 136. As indicated in Table 2, the specific time periods of such output are in each case determined by the programming of MP 102. Turning on third BJ transistor 136 will connect VCC to the base connection of fourth transistor 140 through eleventh resistor 144. Turning on fourth BJ transistor 140 connects motor 46 between VCC and ground, hence DC motor 46 begins operating. Although there are specific time periods shown in Table 2 for emptying lubricator 10 of lubricant 14, it will be understood that such time periods are arbitrary and can be programmed to have different values as the user of the present invention may desire.

TABLE 2

| Days to Empty | Switch 1 | Switch 2 | Switch 3 | Switch 4 | Switch 5 | Switch 6 |
|---|---|---|---|---|---|---|
| 15 | ON | OFF | OFF | OFF | OFF | OFF |
| 30 | OFF | ON | OFF | OFF | OFF | OFF |
| 45 | ON | ON | OFF | OFF | OFF | OFF |
| 60 | OFF | OFF | ON | OFF | OFF | OFF |
| 75 | ON | OFF | ON | OFF | OFF | OFF |
| 90 | OFF | ON | ON | OFF | OFF | OFF |
| 105 | ON | ON | ON | OFF | OFF | OFF |
| 120 | OFF | OFF | OFF | ON | OFF | OFF |
| 135 | ON | OFF | OFF | ON | OFF | OFF |
| 150 | OFF | ON | OFF | ON | OFF | OFF |
| 165 | ON | ON | OFF | ON | OFF | OFF |
| 180 | OFF | OFF | ON | ON | OFF | OFF |
| 195 | ON | OFF | ON | ON | OFF | OFF |
| 210 | OFF | ON | ON | ON | OFF | OFF |
| 225 | ON | ON | ON | ON | OFF | OFF |
| 240 | OFF | OFF | OFF | OFF | ON | OFF |
| 255 | ON | OFF | OFF | OFF | ON | OFF |
| 270 | OFF | ON | OFF | OFF | ON | OFF |
| 285 | ON | ON | OFF | OFF | ON | OFF |
| 300 | OFF | OFF | ON | OFF | ON | OFF |
| 315 | ON | OFF | ON | OFF | ON | OFF |
| 330 | OFF | ON | ON | OFF | ON | OFF |
| 345 | ON | ON | ON | OFF | ON | OFF |
| 360 | OFF | OFF | OFF | ON | ON | OFF |
| 375 | ON | OFF | OFF | ON | ON | OFF |
| 390 | OFF | ON | OFF | ON | ON | OFF |
| 405 | ON | ON | OFF | ON | ON | OFF |
| 420 | OFF | OFF | ON | ON | ON | OFF |
| 435 | ON | OFF | ON | ON | ON | OFF |
| 450 | OFF | ON | ON | ON | ON | OFF |
| 465 | ON | ON | ON | ON | ON | OFF |
| 480 | OFF | OFF | OFF | OFF | OFF | ON |
| 495 | ON | OFF | OFF | OFF | OFF | ON |
| 510 | OFF | ON | OFF | OFF | OFF | ON |
| 525 | ON | ON | OFF | OFF | OFF | ON |
| 540 | OFF | OFF | ON | OFF | OFF | ON |
| 555 | ON | OFF | ON | OFF | OFF | ON |
| 570 | OFF | ON | ON | OFF | OFF | ON |
| 585 | ON | ON | ON | OFF | OFF | ON |
| 600 | OFF | OFF | OFF | ON | OFF | ON |
| 615 | ON | OFF | OFF | ON | OFF | ON |
| 630 | OFF | ON | OFF | ON | OFF | ON |
| 645 | ON | ON | OFF | ON | OFF | ON |
| 660 | OFF | OFF | ON | ON | OFF | ON |
| 675 | ON | OFF | ON | ON | OFF | ON |
| 690 | OFF | ON | ON | ON | OFF | ON |
| 705 | ON | ON | ON | ON | OFF | ON |
| 720 | OFF | OFF | OFF | OFF | ON | ON |

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. For example, the circuit board may utilize surface mount devices, one or more extra LED's to provide additional user information, different microprocessors, or alternate board shapes. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. In particular the following documents are hereby incorporated by reference: U.S. Pat. Nos. 4,023,648; 4,671,386; 6,408,985; 5,732,794. The invention includes all embodiments and variations substantially as hereinbefore described and with reference to the examples and drawings.

The invention claimed is:
1. A lubricator comprising:
   i) a housing defining a main lubricant chamber adapted to contain a fluid lubricant, the housing having a lubricant outlet for discharging the lubricant from the lubricator;
   ii) a piston pump in fluid communication with the main lubricant chamber, the piston pump comprising:
      a) a pump chamber adapted to receive the lubricant from the main lubricant chamber; and,
      b) a pump piston adapted to be driven to discharge the lubricant from the pump chamber through the lubricant outlet in the housing;
   iii) a motor for driving the piston pump, the motor having a drive shaft in axial co-alignment with the pump piston and adapted to rotate a cam about an axis of rotation, wherein rotation of the cam about the axis of rotation causes a cam surface of the cam to ride on the pump piston along a path on a surface of the pump piston, the path having varying heights, relative to the pump piston, along the axis of rotation and the cam surface having varying heights, relative to the drive shaft, along the axis of rotation such that rotation of the cam about the axis of rotation causes the cam to drive reciprocating motion of the pump piston in the pump chamber;
   iv) a means for urging the fluid lubricant into the pump chamber; and,
   v) electronic controls for regulating the activation of the motor to control the discharge of the lubricant from the lubricator.
2. The lubricator of claim 1, wherein the means for urging the fluid lubricant comprises a main chamber piston biased in the housing to urge the lubricant from the main lubricant chamber into the pump chamber.
3. The lubricator of claim 1 further comprising a check valve, positioned to limit the return of discharged lubricant to the lubricator when the piston pump is not driven, wherein the check valve is either:
   i) incorporated into an adapter located on the lubricant outlet; or
   ii) incorporated into the bottom of the pump chamber.

4. The lubricator of claim 1, wherein the pump piston is biased in the pump chamber against the cam surface, so that the plate cam surface rides on the pump piston.
5. The lubricator of claim 1, wherein the electronic controls comprise an input for setting the rate of discharge of the lubricant from the lubricator.
6. The lubricator of claim 1, wherein the cam is mounted on the drive shaft with means for limiting the pressure generated by the piston pump.
7. The lubricator of claim 6, wherein the cam and the drive shaft are arranged to allow upward travel of the cam in the drive shaft.
8. The lubricator of claim 6, wherein the means for limiting the pressure generated by the piston pump comprises an overpressure spring.
9. The lubricator of claim 1, wherein the drive shaft comprises means for compensating for temperature variations so as to modulate lubricator output over a temperature range.
10. The lubricator of claim 9, wherein the means for compensating for temperature variations is arranged to maintain the position of the pump piston in relation to the pump chamber.
11. The lubricator of claim 9, wherein the means for compensating for temperature variations is arranged to allow the cam to move in a direction parallel to the drive shaft.
12. The lubricator of claim 11, wherein the drive shaft is connected to the motor such that the drive shaft is allowed to move in the direction parallel to the drive shaft.
13. The lubricator of claim 9, wherein the means for compensating for temperature variations comprises a retainer to maintain the position of the pump piston in relation to the pump chamber.
14. A lubricator comprising:
   i) means for containing a fluid lubricant having a main lubricant chamber and a lubricant outlet for discharging the lubricant from the lubricator;
   ii) means for pumping the lubricant in fluid communication with the main lubricant chamber, comprising:
      a) a pump chamber adapted to receive the lubricant from the main lubricant chamber; and,
      b) a pump piston adapted to be driven to discharge the lubricant from the pump chamber through the lubricant outlet;
   iii) means for driving the means for pumping, the means for driving having a drive shaft in axial co-alignment with the pump piston and adapted to rotate a cam about an axis of rotation, wherein rotation of the cam about the axis of rotation causes a cam surface of the cam to ride on the pump piston along a path on a surface of the pump piston, the path having varying heights, relative to the pump piston, along the axis of rotation and the cam surface having varying heights, relative to the drive shaft, along the axis of rotation such that rotation of the cam about the axis of rotation causes the cam to drive reciprocating motion of the pump piston in the pump chamber;
   iv) means for urging the fluid lubricant into the pump chamber; and,
   v) means for regulating the discharge of the lubricant from the lubricator.
15. The lubricator of claim 14 further comprising means for limiting the pressure generated by the means for pumping.
16. The lubricator of claim 14, wherein the means for pumping comprises means for compensating for temperature variations so as to modulate lubricator output over a temperature range.

17. A lubricator comprising:
i) a housing defining a main lubricant chamber adapted to contain a fluid lubricant, the housing having a lubricant outlet for discharging the lubricant from the lubricator;
ii) a piston pump in fluid communication with the main lubricant chamber, the piston pump comprising:
   a) a pump chamber adapted to receive the lubricant from the main lubricant chamber; and,
   b) a pump piston adapted to be driven to discharge the lubricant from the pump chamber through the lubricant outlet in the housing; and,
iii) a motor for driving the piston pump, the motor having a drive shaft in axial co-alignment with the pump piston and adapted to rotate a cam about an axis of rotation, wherein rotation of the cam about the axis of rotation causes a cam surface of the cam to ride on the pump piston along a path on a surface of the pump piston, the path having varying heights, relative to the pump piston, along the axis of rotation and the cam surface having varying heights, relative to the drive shaft, along the axis of rotation such that rotation of the cam about the axis of rotation causes the cam to drive reciprocating motion of the pump piston in the pump chamber.

18. The lubricator of claim 17 further comprising electronic controls for regulating the activation of the motor to control the discharge of the lubricant from the lubricator.

* * * * *

UNITED STATES PATENT AND TRADEMARK OFFICE
CERTIFICATE OF CORRECTION

PATENT NO.        : 8,783,418 B2  
APPLICATION NO.   : 11/579668  
DATED             : July 22, 2014  
INVENTOR(S)       : Orlitzky et al.

Page 1 of 1

It is certified that error appears in the above-identified patent and that said Letters Patent is hereby corrected as shown below:

In the Claims

Col. 10, Line 3, in Claim 4, delete the word "plate"

Signed and Sealed this
Fourteenth Day of October, 2014

Michelle K. Lee
*Deputy Director of the United States Patent and Trademark Office*